(12) United States Patent  
Ueda et al.

(10) Patent No.: US 10,198,008 B2  
(45) Date of Patent: Feb. 5, 2019

(54) MOBILE ROBOT SYSTEM

(71) Applicant: Hitachi, Ltd., Chiyoda-ku, Tokyo (JP)

(72) Inventors: Taishi Ueda, Tokyo (JP); Ryosuke Nakamura, Tokyo (JP); Azusa Amino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 15/036,270

(22) PCT Filed: Nov. 15, 2013

(86) PCT No.: PCT/JP2013/080848  
§ 371 (c)(1),  
(2) Date: May 12, 2016

(87) PCT Pub. No.: WO2015/072002  
PCT Pub. Date: May 21, 2015

(65) Prior Publication Data  
US 2016/0299509 A1 Oct. 13, 2016

(51) Int. Cl.  
*G05D 1/02* (2006.01)  
*B25J 9/16* (2006.01)

(52) U.S. Cl.  
CPC .......... *G05D 1/0274* (2013.01); *B25J 9/1676* (2013.01); *G05D 1/024* (2013.01); *Y10S 901/01* (2013.01)

(58) Field of Classification Search  
CPC .............. G05D 1/0274; G05D 1/0246; G05D 2201/0207; G05D 2201/0206;  
(Continued)

(56) References Cited

U.S. PATENT DOCUMENTS 9,251,417 B1 * 2/2016 Xu ..................... G06K 9/00664  
2001/0024514 A1 9/2001 Matsunaga  
(Continued)

FOREIGN PATENT DOCUMENTS

EP 2 506 106 A1 10/2012  
EP 2 615 596 A1 7/2013  
(Continued)

OTHER PUBLICATIONS

International Search Report (PCT/ISA/210) issued in PCT Application No. PCT/JP2013/080848 dated Jan. 14, 2014 with English translation (5 pages).  
(Continued)

*Primary Examiner* — Ryan Rink  
(74) *Attorney, Agent, or Firm* — Crowell & Moring LLP

(57) ABSTRACT

A mobile robot system includes an outside world sensor, a traveling unit, and a control unit. The control unit is configured to provide a history map data. Based on environment information obtained from the outside world sensor, a mobile object appearance point at which no mobile body exists at present but there is the possibility that a mobile body may appear in the future is recognized. In recognizing a door as the mobile object appearance location, if part of an object being obtained from the outside world sensor and having a width equal to or greater than a predetermined width set in advance belongs to an object movement position recorded in the velocity history map, then the part is recognized as a door.

3 Claims, 8 Drawing Sheets

(58) Field of Classification Search
CPC ........... G05D 2201/0209; G05D 1/0214; B25J 9/0003; B25J 11/009; B25J 9/1676; B25J 9/1664
See application file for complete search history.

(56) References Cited

U.S. PATENT DOCUMENTS

| | | | |
|---|---|---|---|
| 2005/0216181 A1* | 9/2005 | Estkowski | G01C 21/20 701/411 |
| 2008/0084283 A1* | 4/2008 | Kalik | B60Q 9/00 340/435 |
| 2009/0149994 A1* | 6/2009 | Kim | G05D 1/0274 700/258 |
| 2009/0326713 A1 | 12/2009 | Moriya | |
| 2010/0222954 A1 | 9/2010 | Ichinose et al. | |
| 2010/0235033 A1 | 9/2010 | Yamamoto et al. | |
| 2011/0093134 A1* | 4/2011 | Emanuel | G05D 1/0289 701/2 |
| 2012/0083960 A1* | 4/2012 | Zhu | G05D 1/0214 701/23 |
| 2014/0128093 A1* | 5/2014 | Das | H04W 64/006 455/456.1 |
| 2014/0244151 A1* | 8/2014 | Matsubara | G08G 1/165 701/301 |
| 2015/0057871 A1* | 2/2015 | Ono | G01C 21/34 701/23 |
| 2015/0160024 A1* | 6/2015 | Fowe | G01C 21/34 701/400 |
| 2015/0223659 A1* | 8/2015 | Han | A47L 11/4011 134/18 |
| 2016/0274589 A1* | 9/2016 | Templeton | G05D 1/0246 |
| 2017/0116487 A1* | 4/2017 | Yamazaki | G06K 9/00805 |
| 2017/0168488 A1* | 6/2017 | Wierzynski | G05D 1/0061 |
| 2017/0212513 A1* | 7/2017 | Iida | G05D 1/0061 |
| 2017/0225336 A1* | 8/2017 | Deyle | B25J 9/1679 |

FOREIGN PATENT DOCUMENTS

| | | |
|---|---|---|
| JP | 2001-266123 A | 9/2001 |
| JP | 2008-65755 A | 3/2008 |
| JP | 2009-291540 A | 12/2009 |
| JP | 2009-294934 A | 12/2009 |
| JP | 2010-55498 A | 3/2010 |
| JP | 2010-134656 A | 6/2010 |
| JP | 2010-231359 A | 10/2010 |
| JP | 2012-208782 A | 10/2012 |
| WO | WO 2011/064821 A1 | 6/2011 |
| WO | WO 2012/033173 A1 | 3/2012 |

OTHER PUBLICATIONS

Fox et al, "The Dynamic Window Approach to Collision Avoidance", IEEE Robotics & Automation Magazine, 4(1), 1997 (23 pages).

* cited by examiner

MOBILE ROBOT SYSTEM

TECHNICAL FIELD

The present invention relates to a mobile robot system.

BACKGROUND ART

As a background art in the technical field of a mobile robot, a mobile robot system described in Patent Document 1 is disclosed as a system which reduces the risk of collision between a robot and an existing article when the robot moves. As particular contents, it is indicated that the mobile robot system includes an environment map production unit which produces an environment map indicative of a geometrical situation of an environment including existing articles, a movement path data production unit which produces movement path data of movement of a mobile robot in a coordinate system of the environment map, and a risk level parameter calculation unit which calculates a risk level parameter indicative of the possibility that, during movement of the mobile robot, the mobile robot may collide with an existing article due to a control error from robot configuration information relating to the mobile robot, the environment map and the movement path data.

Further, a mobile robot system described in Patent Document 2 is a system which avoids, in an environment in which people and a robot come and go, collision from being caused by jumping out of a person or a robot. The mobile robot system includes an obstacle detection unit which detects an obstacle, a path production unit which sets both of a path and a velocity along and at which a robot arrives at a destination while bypassing the detected obstacle on the basis of an avoidance method determined in advance, and a mobile unit which carries and moves together with the obstacle detection unit and the path production unit. Further, it is disclosed that the distance between an end point of an object existing in an advancing direction of the mobile robot and the end point is measured, and if the end point of the object is detected, then the path and the velocity of the mobile robot are controlled such that collision of the mobile robot around the center at the end point with an obstacle which jumps out from a blind spot in the advancing direction of the mobile robot.

PRIOR ART DOCUMENTS

Patent Documents

Patent Document 1: JP-2009-291540-A
Patent Document 2: JP-2010-055498-A
Patent Document 3: JP-2008-65755-A
Non-Patent Document 1: "The Dynamic Window Approach to Collision Avoidance," IEEE Robotics & Automation Magazine, 4(1), pp. 23-33, 1997

SUMMARY OF THE INVENTION

Problem to be Solved by the Invention

In a human living environment, while a mobile robot is traveling, it may collide with a person who jumps out from a street corner, from behind a big baggage, from a door or the like or with an object which begins to move when the mobile robot approaches the object although the object stands still at a point of time at which the mobile robot captures the object (such object is hereinafter referred to as potential mobile object). In this manner, even if a mobile object is not found at a point of time at which sensing data is acquired, a mobile object sometimes appears and collides with the mobile robot. In order for the mobile robot to move safely and efficiently, it is significant for the mobile robot to travel designating a place at which a mobile object may appear in the future with a high likelihood. In the following description, a place which is at a street corner or is behind an object or a door and cannot be recognized or a place which is outside a measurement range of an outside world sensor of a mobile robot system and cannot be recognized is referred to as blind spot.

In the mobile robot system disclosed in Patent Document 1, jumping out of a mobile object from a blind spot or collision with a potential mobile object cannot be avoided in an environment in which mobile objects such as people come and go. In the configuration of the mobile robot system of Patent Document 1, it seems recommendable to apply a method of registering in advance regions in which a mobile object is likely to jump out such as street corners or doors into an environmental map and control the mobile robot so as to bypass the regions. However, the method cannot cope with jumping out of a mobile object from a blind spot by a shield generated temporarily such as the back of a baggage placed temporarily or the back of a row of people. Further, in order to avoid collision with a potential mobile object, it seems recommendable to apply a method wherein the mobile robot recognizes an object such as a person from the appearance of the same by an outside world sensor and travels far away from the person. However, since a person sometimes moves an object other than the person or some other person, it is difficult to decide from the appearance whether or not there is the possibility that the object may move.

Meanwhile, although the mobile robot system disclosed in Patent Document 2 can avoid collision of a mobile robot with a mobile object jumping out from a blind spot, it cannot avoid collision with a potential mobile object. Further, since the mobile robot is controlled so as to avoid all blind spots along an advancing direction irrespective of whether or not a mobile object is likely to jump out, the movement efficiency of the mobile robot sometimes drops significantly. For example, in an environment which includes a large number of blind spots in an advancing direction of the mobile robot, since it cannot be avoided for the mobile robot to pass the vicinity of the blind spots in order to reach a destination point, the mobile robot decelerates or stops frequently. If it can be decided whether or not there is the possibility that a mobile object may jump out from each blind spot, then it is possible to raise the movement efficiency by decelerating or stopping the mobile robot only when the possibility of collision is high.

Therefore, the present invention provides a mobile robot system which can identify, in an environment in which mobile objects such as people come and go, a place at which the possibility that a mobile object may appear is high and can efficiently avoid collision with the moving object.

Means for Solving the Problem

To solve the problem described above, according to the present invention, there is provided a mobile robot system including an outside world sensor configured to measure a position of an object in a surrounding environment, a traveling unit configured to displace an own position, and a control unit configured to control the traveling unit, and wherein history map data in which positions (object movement positions) at each of which an object has moved and velocity information of the object within a predetermined period are provided on map data indicative of a movement space of the robot; based on environment information obtained from the outside world sensor, a mobile object appearance point at which no mobile body exists at present but there is the possibility that a mobile body may appear in the future is recognized; the velocity information of an object which moved over a position in the neighborhood of the appearance point in the past is read out from the map data; a shape of a collision risk area which is an area in which the possibility that a mobile object may appear and collide with the robot in the future in response to the velocity information is high is determined; and the control unit controls at least one of an advancing direction and a velocity of the robot in response to a positional relationship between the collision risk area and the robot.

Further, according to the present invention, the mobile robot system is configured such that, when velocity information of a mobile object is to be recorded into a velocity history map, a plurality of representative directions are provided by dividing an overall circumference at fixed angular intervals around an object movement position; one of the representative directions which is nearest to the direction of a velocity vector of the mobile object and a norm of the velocity vector are recorded at the position; and when a mobile object moves over the position by a plural number of times, a maximum value of the norm of mobile object velocity vectors measured till then is recorded.

Further, according to the present invention, the mobile robot system is configured such that the mobile object appearance point is at least one of a door, the back of a shield and a stationary object having a width/height equal to or smaller than a predetermined width/height set in advance.

Further, according to the present invention, the mobile robot system is configured such that, when a door is to be recognized as the mobile object appearance point, if part of an object of a width obtained from the outside world sensor and equal to or greater than a predetermined width set in advance belongs to an object movement position recorded in the velocity history map, then the part is recognized as a door.

Further, according to the present invention, the mobile robot system is configured such that, when a stationary object of a width/height equal to or smaller than a predetermined width/height is to be recognized, if at least part of the object belongs to an object movement position recorded in the velocity history map, then the position is decided as a mobile object appearance point.

Effect of the Invention

With the present invention, it can be implemented to provide a mobile robot system which identifies, in an environment in which mobile objects such as people come and go, a place at which the possibility that a mobile object may appear is high and can efficiently avoid collision with a mobile object.

MODES FOR CARRYING OUT THE INVENTION

Figure 1:
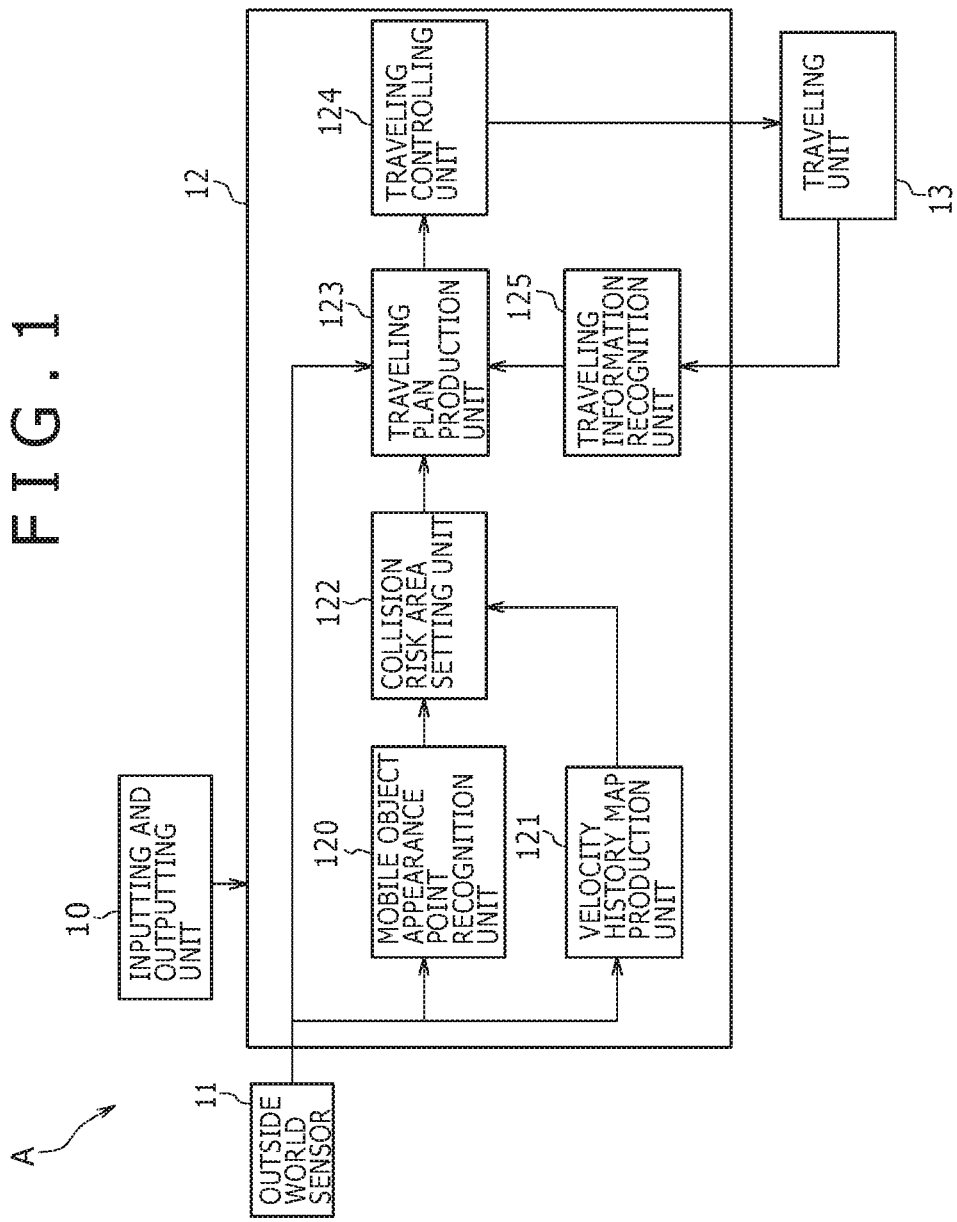
FIG. 1 depicts a system configuration of a mobile robot system.

An outline of a mobile robot system of the present invention is described.

In the present mobile robot system, a velocity history map is used in which positions passed by objects within a fixed period in the past and object velocities at the positions are recorded on a map on which a mobile robot can interpret the space of movement thereof. Since a position at which a velocity of a mobile object is recorded represents that a mobile object passed the position in the past, the possibility that a mobile object may pass the position at a velocity near to the velocity recorded thereat again. Therefore, if the velocity recorded at a spot at which there is the possibility that a mobile object may appear in the future (mobile object appearance point) such as the vicinity of a blind spot is referred to in the velocity history map, then the velocity when a mobile object appears from the spot can be estimated. Conversely, if no velocity is recorded, then it can be estimated that a mobile object is less likely to appear from the spot. Further, in order to cope with a temporary blind spot such as the back of a baggage placed temporarily, mobile object appearance points always continue to be recognized by an outside world sensor while the mobile robot is moving. The period within which a velocity of a mobile object is to be recorded is suitably set depending upon the degree of congestion in the movement space. Further, if the velocity history map is produced after every period or in response to an environment such as the weather or the road surface situation and, when a velocity history map is to be utilized, a velocity history map or maps recorded in similar conditions in the past are used, then movement control suitable for the conditions can be anticipated.

In the following, a mode for carrying out the present invention (referred to as "embodiment") is described in detail suitably with reference to the accompanying drawings. It is to be noted that, in the drawings, like elements are denoted by like reference characters and overlapping description of them is omitted herein. Further, the components and mechanisms of the systems are not limited to those described hereinbelow but can be changed or added suitably if the functions of the functional components can be implemented.

First Embodiment

FIG. 1 depicts a system configuration of a mobile robot system A of the present embodiment. The mobile robot system A includes an inputting and outputting unit 10 for performing registration of a movement starting signal and a destination point into a mobile robot 1 used in the mobile robot system A, an outside world sensor 11 for detecting a shape and a position of an object around the mobile robot 1, a control unit 12 for controlling traveling of the mobile robot 1, and a traveling unit 13 for displacing the position of the mobile robot 1. The control unit 12 includes a mobile object appearance point recognition unit 120 for recognizing a mobile object appearance point on the basis of a body shape obtained from the outside world sensor 11, a velocity history map production unit 121 and a collision risk area setting unit 122 for setting a collision risk area on the bases of information from the mobile object appearance point recognition unit 120 and the velocity history map production unit 121.

The collision risk area signifies an area in which, when a mobile object appears from a mobile object appearance point, the possibility that the mobile robot 1 and the mobile object may collide with each other is high. Accordingly, avoidance or reduction of collision can be anticipated by bypassing the collision risk area or by decelerating the mobile robot 1 in the area. A production method of a velocity history map and a setting method of a collision risk area are hereinafter described. The control unit 12 further includes a traveling plan production unit 123 for producing a traveling plan so as to reduce the risk of collision of the mobile robot on the basis of collision risk areas obtained from the collision risk area setting unit 122, an object position obtained from the outside world sensor 11 and traveling information at present of the mobile robot, a traveling controlling unit 124 for sending a control signal to the traveling unit 13 so as to cause the mobile robot 1 to travel in accordance with the traveling plan from the traveling plan production unit 123, and a traveling information recognition unit 125 for recognizing a moving velocity and a position of the mobile robot on the basis of the information from the traveling unit 13.

Figures 2A, 2B:
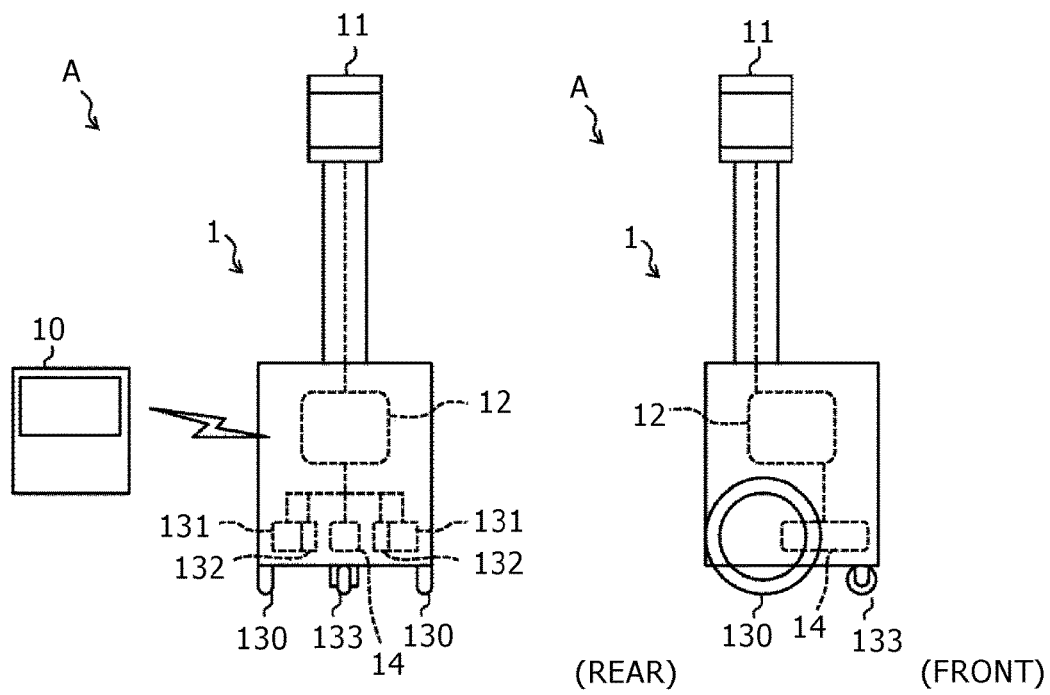
FIGS. 2A and 2B depict a hardware configuration of the mobile robot system.

FIG. 2 depicts a hardware configuration of the mobile robot system. In the present embodiment, the inputting and outputting unit 10 is provided outside the mobile robot 1 and transmits and receives information to and from the mobile robot 1 by wireless communication, for example, by a wireless LAN. A laser scanner is provided as the outside world sensor 11 at a position of the mobile robot 1 at the height of approximately 1 m and measures a distance to an object at the height corresponding to the body of a pedestrian. The mobile robot 1 includes, in the inside thereof, a computer as the control unit 12, the traveling unit 13, and a battery as a power source 14 for the control unit 12 and the traveling unit 13. The traveling unit 13 includes driving wheels 130, a motor 131 for rotating the driving wheels 130, an encoder 132 for measuring the speed of rotation of the motor 131, and a free type caster 133. The speed of rotation of the motor is transmitted from the encoder 132 to the traveling information recognition unit 125 in the computer, and the traveling information recognition unit 125 calculates, from a time history of the speed of rotation of the motor, a position and a direction as well as an advancing speed and a turning speed at present of the mobile robot 1. While, in the present embodiment, the inputting and outputting unit is provided outside the mobile robot 1, where a wireless LAN environment is not available or where the mobile robot 1 has a size sufficient to incorporate an inputting and outputting unit, also the inputting and outputting unit may be provided on the mobile robot 1 itself. Further, while the outside world sensor 11 is provided on the mobile robot, for example, a camera may be incorporated in a movement environment of the mobile robot. Further, while the computer as the control unit 12 is provided inside the mobile robot 1, where the mobile robot 1 is not so great that a computer cannot be accommodated therein or the calculation process is so great that a computer cannot be installed, in the mobile robot 1, a computer may be provided outside the mobile robot 1 such that information may be transferred by wireless communication. Further, while a laser scanner is used as the outside world sensor, a stereo camera, a 3D distance sensor or the like may be used suitably. Further, while wheels are used as the traveling unit 13, legs, crawlers, a hover or the like may be used suitably.

A production method of a velocity history map is described. In the present embodiment, movement information of the robot is divided into grids of a square shape having a side of approximately several tens cm to several m, and when a mobile object passes on each of the grids during a predetermined period, the velocity of movement of the mobile object is recorded into the grid. If a mobile object passes by a plural number of times on the same grid, then a velocity of the mobile object having a maximum absolute value is recorded. A grid on which a velocity is recorded is hereinafter referred to as velocity recorded grid, and a grid on which a velocity is not recorded is hereinafter referred to as velocity non-recorded grid.

The velocity of a mobile object is estimated, for example, from a time series of a measurement point group obtained from the laser scanner used as the outside world sensor 11. Since data obtained from the laser scanner are a string of data at predetermined angular distances, a recognition technique for recognizing a plurality of obstacles as discrete obstacles is required. For example, as the recognition technique, a method disclosed in Patent Document 3 is available. According to the method, a sudden changing point at which the distance value obtained from the laser scanner at certain time t changes suddenly is detected first, and the data string with respect to the angle is divided for every unity of successive points and stores the divided data as segments into the memory of the computer. Consequently, characteristic amounts of a representative position such as the center of gravity, shape and so forth of each segment at time t are recognized. Then, calculation is performed similarly at time t+Δt to obtain characteristic amounts of the segments. Here, the characteristic amounts of the segments obtained at time t and the characteristic amounts of the segments at time t+Δt are compared with each other. Then, those segments which indicate characteristic amounts close to each other are recognized as the same obstacles, and the velocity of each obstacle can be obtained from the changing amount of the representative position. Further, an obstacle whose moving velocity is almost 0 is regarded as a stationary obstacle.

When a velocity history map is to be produced by the method described above, it is necessary for the mobile robot 1 to move all over the area in the movement environment to record mobile object velocities. Therefore, it may be recommendable to temporarily handle all velocity non-recorded grids as velocity recorded grids during production of a velocity history map, and in advance, manually input a maximum velocity of each mobile object which moves in the movement environment. According to this, a collision risk area is set by a method hereinafter described, and the mobile robot 1 can travel in safe although the movement efficiency drops. When production of a velocity history map comes to an end, any grid at which the velocity has not been updated at all is determined as a velocity non-recorded grid. Although the grids of a velocity history map in the present embodiment have a square shape, the shape of the grids may be set to some other geometrical shape such as a regular hexagon depending upon the property of a mobile object, the movement environment and an application method of the velocity history map. The recorded mobile object velocity may otherwise be represented not by grids but by a three-dimensional function such as a probability density function in accordance with a map position.

Figure 3:
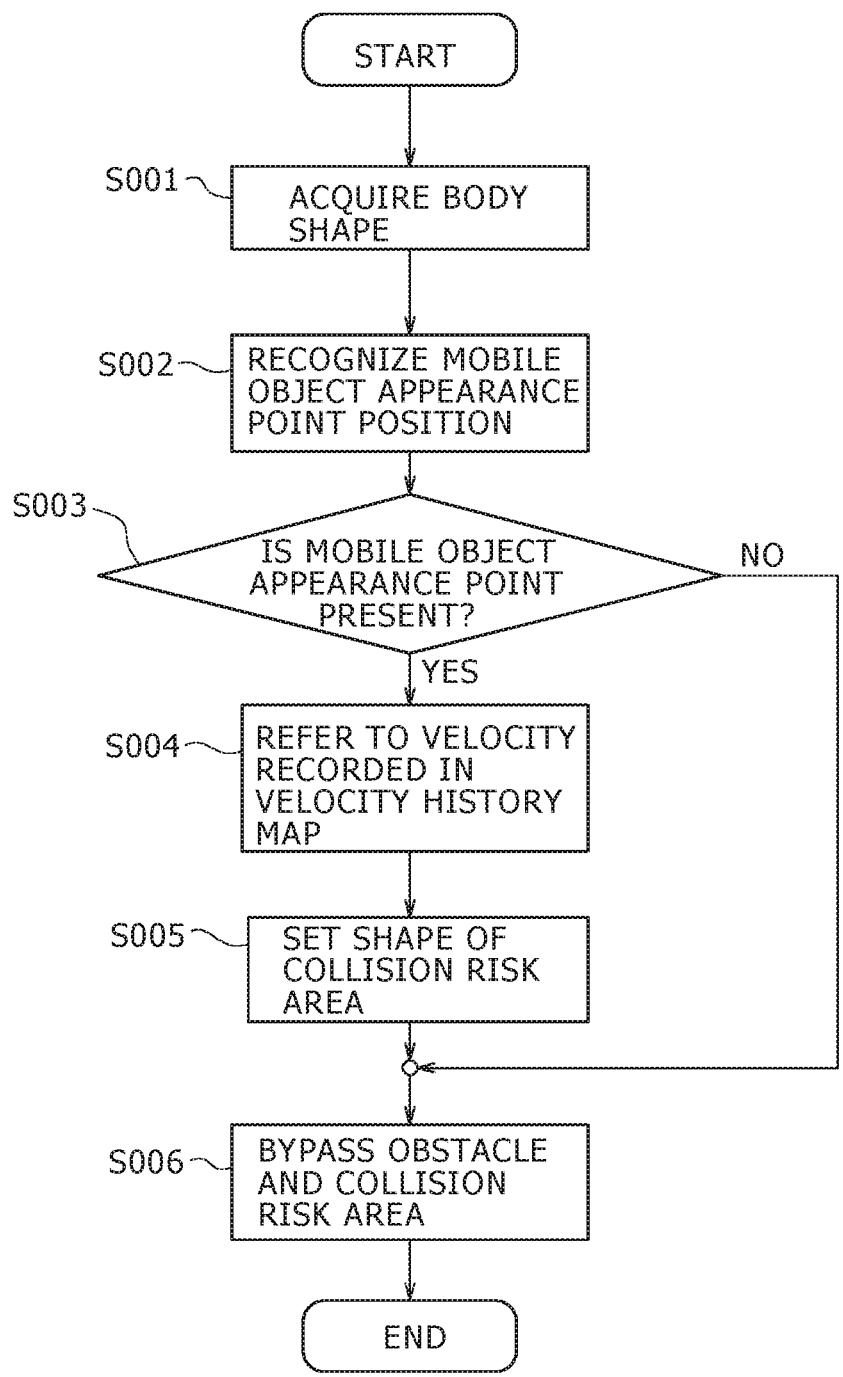
FIG. 3 is a flow chart for collision avoidance.

FIG. 3 depicts a flow chart of a collision avoidance flow of the mobile robot system A. At step 001 (hereinafter referred to as S001), a body shape is acquired from the outside world sensor 11. Where a minimum measurement angle of the laser scanner is represented by $\theta_0$ and the angular resolution of the laser scanner is represented by $\Delta\theta$, then the distances in a plurality of discrete directions $\theta_k=\theta_0+k\Delta\theta$ (k=1, 2, 3, . . . , N) as a group of a series of measurement points. At S002, the position of a mobile object appearance point is recognized on the basis of the object shape obtained at S001. A recognition method of a mobile object appearance point is hereinafter described. If a mobile object appearance point is found at S003, then the processing advances to S004. At S004, the mobile object passing velocities in the past at the mobile object appearance point are referred to from a velocity history map. At S005, the shape of a collision risk area is set in response to the mobile object passing velocities referred to at S004. At S006, a travel plan is produced such that the collision risk area set at S005 and the obstacle acquired from the outside world sensor are bypassed and is transmitted to the traveling controlling unit 124.

Now, the recognition method of a mobile object appearance point and the setting method of a shape of a collision risk area at S002 to S005 are described. In the present embodiment, each of a blind spot as a door, a street corner or an obstacle and a potential mobile object is recognized as a mobile object appearance point.

Figure 4:
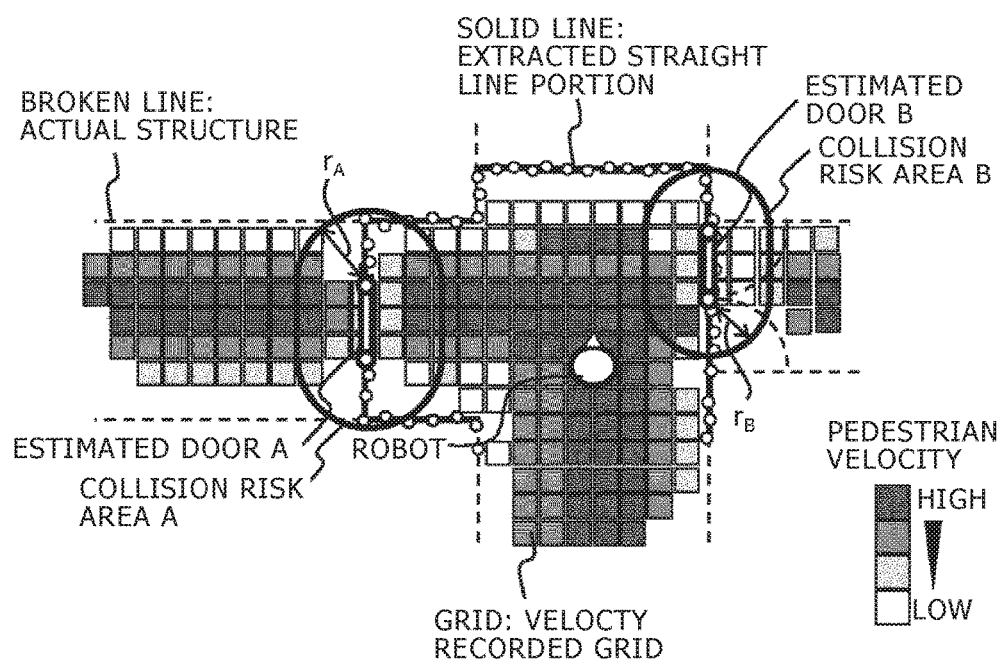
FIG. 4 is an explanatory view of a door recognition method.

A recognition method of a door is described with reference to FIG. 4. Almost all doors are attached to a wall, and therefore, a wall is extracted first from a measurement point group of the laser scanner. If part of an extracted wall overlaps with velocity recorded grids of the velocity history map, then since the part was passed by a mobile object in the past, the part can be estimated as a part (doors A and B). Then, a region in the inside of an oval shape centered at each of the doors A and B is set as a collision risk area. The size of the collision risk area is determined depending upon a maximum absolute value of the mobile object velocity recorded at all velocity grids belonging to each of the doors A and B, and, for example, if the absolute values at the doors A and B are $v_A$ and $v_B$, respectively, then the oval radii $r_A$ and $r_B$ are set to $av_A$ and $av_B$, respectively. It is to be noted that "a" is a positive real number and is set suitably depending upon the acceleration-deceleration performance of the mobile robot. From the foregoing, for a door which was passed at a higher velocity by the mobile object in the past, the collision risk area is set greater thereby to achieve control of the mobile robot 1 such that the mobile robot 1 passes farther away from the door. On the contrary, since a door which was not passed at all by a person such as a permanently closed door is not detected, it is possible for the mobile robot 1 to pass by the door safely and efficiently.

Figure 5:
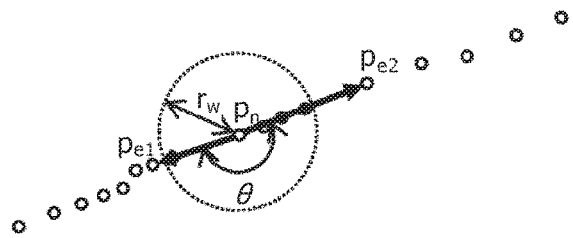
FIG. 5 is an explanatory view of a wall recognition method.

An extraction method of a wall is described with reference to FIG. 5. Since a wall is obtained as a linear measurement point group as depicted in FIG. 5, linear portions of a length greater than a fixed length are detected in an ascending order of the angle index from within the measurement point group and are decided as a wall. A characteristic of a wall is that the angle defined by three measurement points belonging to the wall is close to 180 degrees. Accordingly, if attention is paid to a certain point $P_n$, and two points $P_{e1}$ and $P_{e2}$ spaced by more than a fixed distance $r_W$ and indicating higher and lower angle indices of the laser scanner with reference to the point. $P_n$ are selected and then the magnitude $\theta$ of the angle $P_{e1}P_nP_{e2}$ is equal to or greater than a fixed value $\theta_{min}$, then it may be decided that the point $P_n$ is on a straight line. Simultaneously, also the distance between adjacent measurement points is checked, and if the distance is equal to or greater than a fixed value $r_d$, then it is decided that the point $P_n$ is an end point of the body. It is to be noted that $r_w$ and $r_d$ are set empirically, for example, in accordance with the accuracy of the laser scanner or the movement environment.

Figure 6:
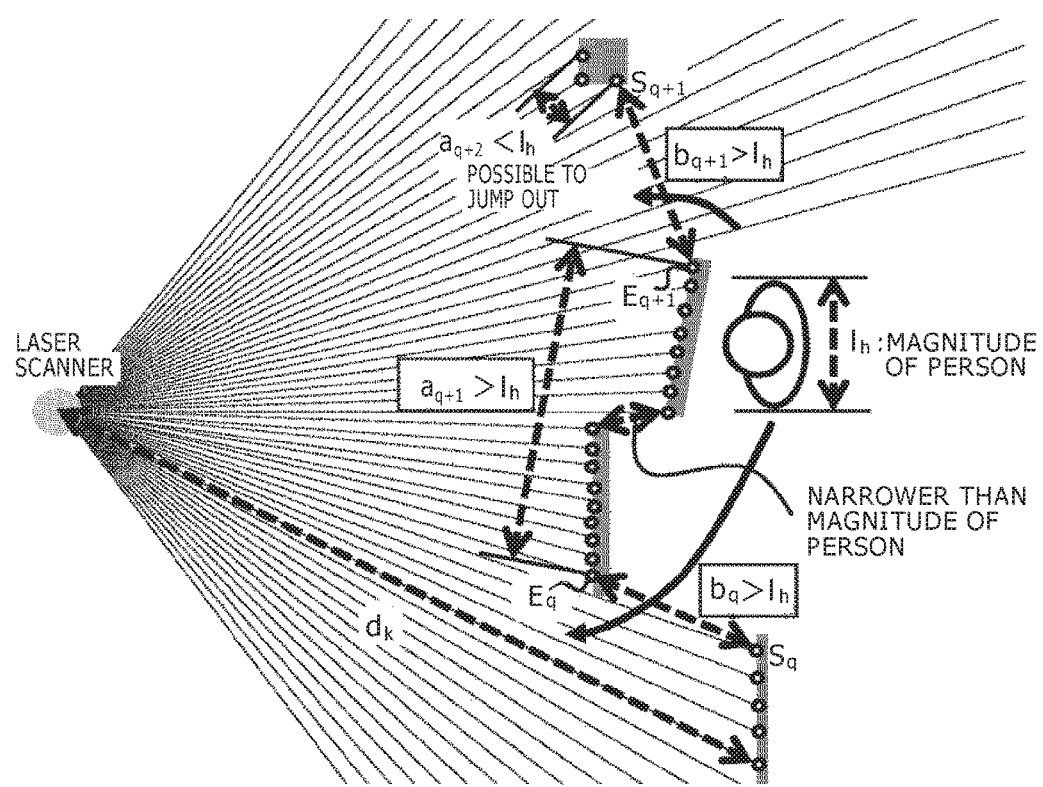
FIG. 6 is an explanatory view of a blind spot recognition method.
Figure 7:
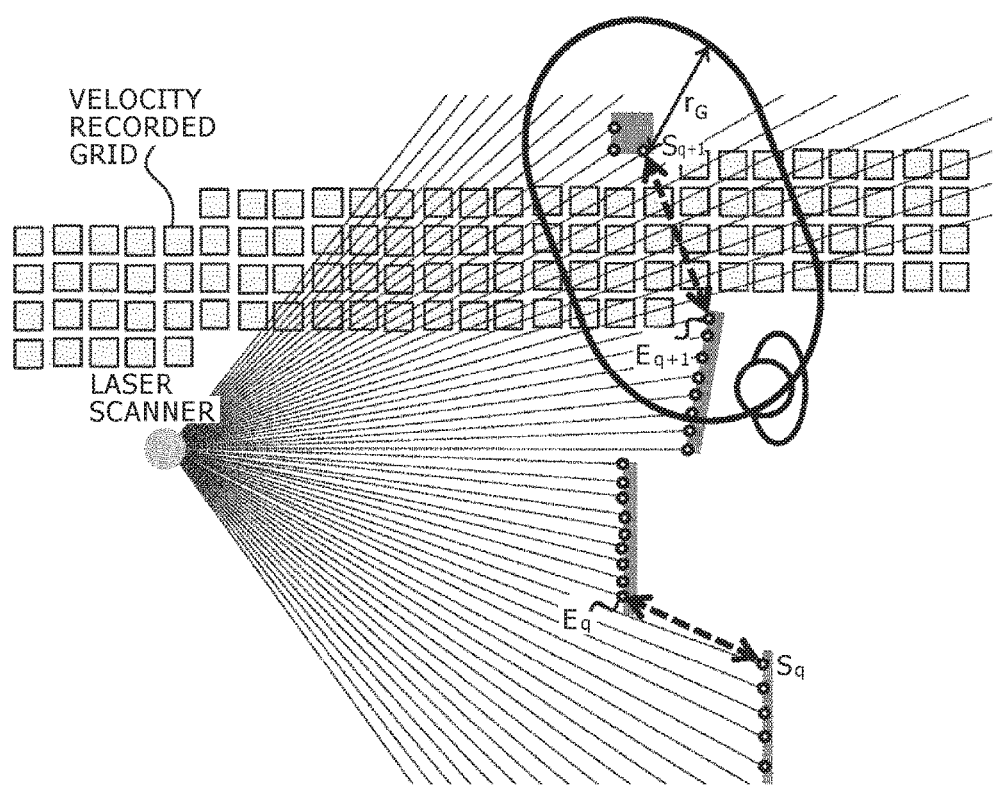
FIG. 7 is an explanatory view of a setting method of a collision risk area by a blind spot.

A recognition method of a blind spot by a street corner or an obstacle is described with reference to FIG. 6. In blind spot destination, every gap between measurement points from which an object can physically jump out is extracted, and then the possibility that a person may jump out from the gap and the velocity at which a person may jump out are estimated by referring to the velocity history map. For example, the gap from which a person can physically jump out is a gap located adjacent a shield having a size sufficient for a person to hide behind the same and having a sufficient width for a person to jump out therethrough. If, from within a successive measurement point group, the continuous length $a_q$ (q is a natural number indicative of a point group index) of a point group is equal to or greater than a length $l_h$ in which a person hides and a measurement point $S_q$ to which the distance from an end point $E_q$ of the distance data point group is equal to or greater than the length $l_h$ of a person is found as depicted in FIG. 6, then a person can jump out from the gap between the point $E_q$ and the point $S_q$. In this manner, in FIG. 6, the gaps between $E_q$ and $S_q$ and between $E_{q+1}$ and $S_{q+1}$ are detected as gaps from which a person can jump out. FIG. 7 depicts an example of setting of a collision risk area by a blind spot. The grids indicate velocity recorded grids. However, in order to make it easier to see the figure, all grids are indicated by the same color irrespective of the recorded velocities. Similarly as in the case of a door, if velocity recorded grids are included in a gap, then it is presumed that the possibility that a person may jump out from the gap at a velocity recorded in the velocity history map is high. Since velocity recorded grids are present in $E_{q+1}S_{q+1}$ from between $E_qS_q$ and $E_{q+1}S_{q+1}$, there is the possibility that a mobile object may jump out from $E_{q+1}S_{q+1}$. Therefore, the inside of an oval shape centered at $E_{q+1}S_{q+1}$ is set as a collision risk area. The magnitude of the collision risk area is determined such that, for example, where the maximum absolute value of the velocity of the velocity recorded grid in the gap $E_{q+1}S_{q+1}$ is $v_G$, the oval radius $v_G$ is set to $av_G$ of the collision risk area. By the method described above, a safe and efficient movement can be achieved by bypassing a place in the proximity of a blind spot, at which the possibility that a person may jump out at a high speed is high, by a great amount but conversely ignoring a blind spot from which a person never jumps out.

Figure 8A:
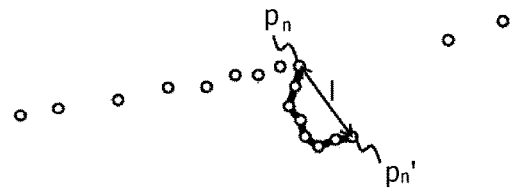
FIGS. 8A and 8B are explanatory views of a potential mobile object recognition method and a collision risk area setting method.
Figure 8B:
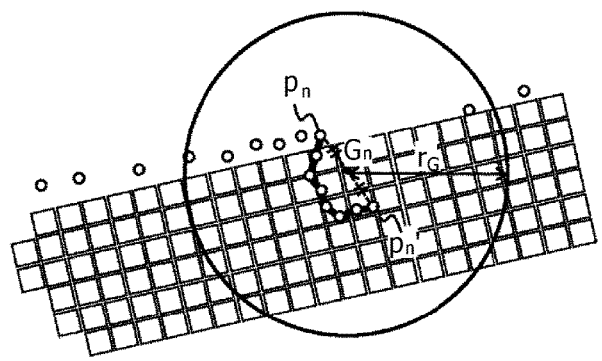

A recognition method of a potential mobile object is described with reference to FIG. 8. Since a velocity recorded grid of a velocity history map is a position at which a pedestrian passed in the past, if an isolated object exists on a velocity recorded grid, then it can be presumed that the body is a potential mobile object. On the contrary, if an isolated body does not exist on a velocity recorded grid, then it can be presumed that the object is a fixed article such as a column or a trash. Therefore, as depicted in FIG. 8(*a*), from a measurement point group, a series measurement point group having a width within a fixed range 1 (point group from $p_n$ to $p_n'$) is extracted, and by referring to the velocity of all velocity recorded grids just below the straight line $p_n p_n'$, a maximum absolute value of the velocity is determined. As the fixed range 1, a maximum value of a mobile object existing in the movement space of the mobile robot is set suitably. If vG is recorded as the maximum absolute value, then the inside of a circle centered at the middle point $G_n$ of the straight line $p_n p_n'$ and having a radius $r_G$ equal to $av_G$ is set as a collision risk area. By the method described above, if an isolated body begins to move at a high speed, then the mobile robot 1 travels in a spaced relationship far away from the object but travels ignoring a fixed article, by which a safe and efficient movement can be anticipated.

The traveling plan production unit 123 applies a generally well-known obstacle avoidance method disclosed in Non-Patent Document 1 to perform avoidance of an obstacle and a collision risk area. In this method, the mobile robot 1 sets, from a position, an advancing speed and a turning speed thereof at present, several stages of target turning speed candidates $p_1, p_2, \ldots, p_k$ and several stages of target advancing speed candidates $v_1, v_2, \ldots, v_q$ with which the mobile robot 1 can move without colliding with an obstacle within a next control cycle. Then, the mobile robot 1 evaluates a distance function $L_{col}(p_k, v_q)$ to an obstacle, a direction function $\theta_{goal}(p_k)$ to a destination point sent thereto from the inputting unit, an advancing speed function $V(v_q)$ and a distance function $L_{risk}(p_k, v_q)$ to a collision risk area, which is added uniquely in the present embodiment, when the mobile robot 1 advances at the target advancing and turning speeds. Then, the mobile robot 1 multiplies the evaluated functions mentioned above by weights $\alpha$, $\beta$, $\gamma$ and $\delta$, respectively, and sums the products as represented by an objective function given as an expression 1 below:

$$G(p_k, v_q) = \alpha \cdot L_{col}(p_k, v_q) + \beta \cdot \theta_{goal}(p_k) + \gamma \cdot V(v_q) + \delta \cdot L_{risk}(p_k, v_q)$$

[Expression 1]

and then selects $p_k$ and $v_q$ maximize the objective function. $G(p_k, v_q)$. $L_{col}$ is 1 if, when the mobile robot 1 advances with $p_k$ and $v_q$, the distance $L_{ob}$ to an obstacle is equal to or greater than a threshold value $L_{max}$ which can be regarded sufficient for safety, but is 0 if the distance $L_{ob}$ is smaller than the threshold value $L_{min}$, and indicates, when $L_{min} < L_{ob} < L_{max}$, a value which approaches 1 as the distance $L_{ob}$ increases but approaches 0 as the distance $L_{ob}$ decreases. $\theta_{goal}(p_k)$ is 1 if, when the mobile robot 1 advances with $p_k$, it is directed toward the destination point, but is 0 if the mobile robot 1 is directed in the opposite direction, and indicates, in any other case, a value which approaches 1 as the direction comes closer to the direction to the destination point but approaches 0 as the direction is displaced from the direction toward the destination point. $V(v_q)$ is 1 if $v_q$ coincides with a predetermined speed $v_{ideal}$ suitable for movement in the movement environment but is 0 if the mobile robot 1 stops, and indicates, in any other case, a value which approaches 1 as $v_q$ approaches $v_{ideal}$. $L_{risk}(p_k, v_q)$ is 1 if, when the mobile robot 1 advances with $p_k$ and $v_q$, the mobile robot 1 is outside a collision risk area, but is 0 if a penetration amount $d_{ob}$ in a collision risk area is a limit amount $d_{max}$ which is regarded as risky, and indicates, when $d_{min} < d_{ob} < d_{max}$, a value which approaches 1 as $d_{ob}$ decreases but approaches 0 as $d_{ob}$ increases. The parameters $\alpha$, $\beta$, $\gamma$, $\delta$, $L_{min}$, $L_{max}$, $L_{ideal}$, $d_{min}$ and $d_{max}$ mentioned above can be set through a simulation or by an empirical rule. The selected target turning speed $p_k$ and the target advancing speed $v_q$ are conveyed to the traveling controlling unit 124. If the angle $\theta$ of the velocity vector to the destination point can be selected only from among destination candidates equal to or greater than 90 degrees or if $G(p_k, v_q)$ indicates a maximum value when $v_q \leq 0$, then it is decided that it is impossible for the mobile robot 1 to avoid the obstacle while the mobile robot 1 is advancing toward the destination point, and the mobile robot 1 stops or generates warning sound.

With the embodiment described above, it can be implemented to provide a mobile robot system which identifies, in an environment in which mobile objects such as people come and go, a blind spot or a door from which the possibility that a mobile object may jump out is high or a blind spot or a door from which the possibility that a mobile object may jump out is low and further predicts a potential mobile object and can efficiently avoid collision with a mobile object.

Second Embodiment

A second embodiment provides a mobile robot system 2 which takes also a moving direction of a mobile object from a mobile object appearance point into consideration. In the present embodiment, a velocity vector is recorded for each grid on a velocity history map to allow estimation of a moving direction in the future of a mobile object which may appear from the mobile object appearance point. As an environment for which the present embodiment is effective, for example, an environment in which people are always moving in the same direction is available.

Figure 9:
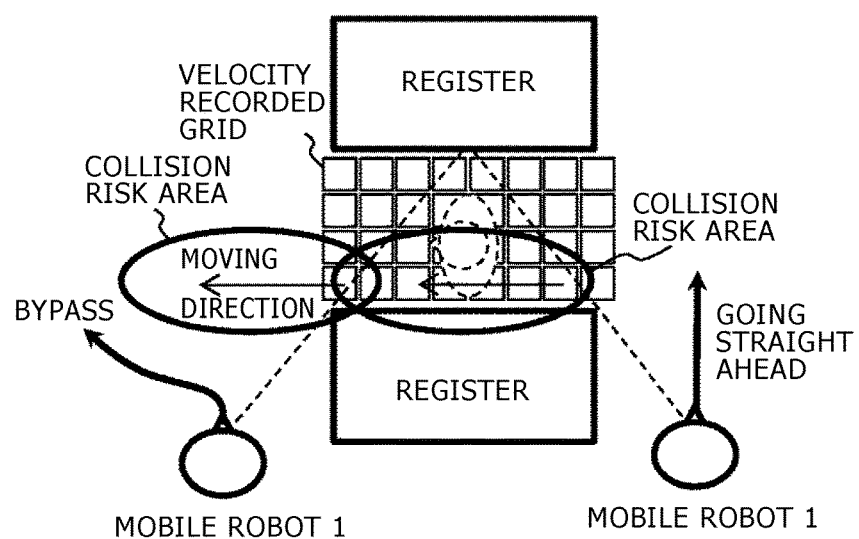
FIG. 9 is a view illustrating an effect of a second embodiment.

FIG. 9 depicts an example of a situation in the proximity of a register of a supermarket. In the proximity of a register of a supermarket, people always move from the entrance to the exit of the register. If a direction in which a person appears from a blind spot of the register is known, then since the shape of a collision risk area can be set in response to the moving direction of the mobile object as depicted in FIG. 9, a robot can travel away only from the proximity of the exit without bypassing the entrance of the register. Consequently, a safe and efficient movement of the mobile object can be anticipated. It is to be noted that, while FIG. 9 depicts only two collision risk areas in order to facilitate understandings, collision risk areas are set suitably in accordance with a movement environment such that they are produced from all velocity recorded grids existing at blind spots.

A velocity history map production method in the present embodiment is described with reference to FIG. 10. If all velocity vectors of a mobile object are stored as they are, then the data amount is very great, and a disadvantage is likely to occur in terms of the cost and implementation. Therefore, measured velocity vectors are assigned to several representative directions and recorded as the assigned directions.

Figure 10:
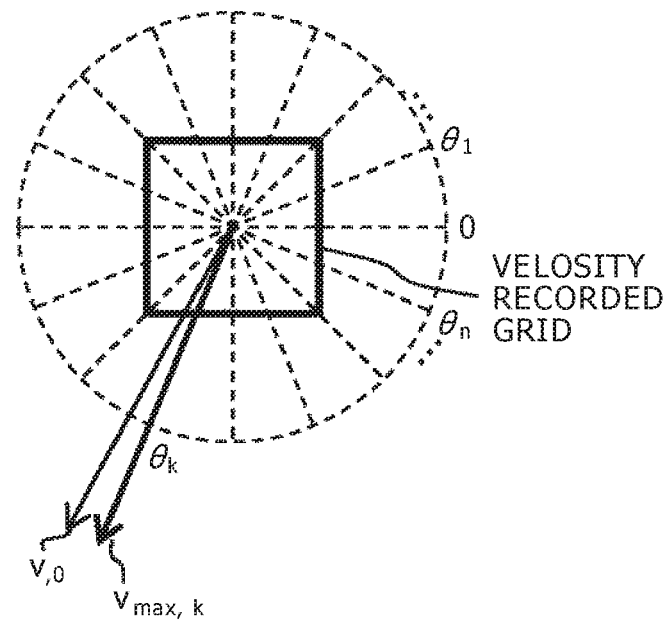
FIG. 10 is an explanatory view of a velocity recording method into a velocity history map in the second embodiment.

In FIG. 10, the whole circumference around the origin at the center of each grid of the velocity history map is divided at fixed angular intervals to set representative directions $\theta_1$ to $\theta_n$. Upon production of the velocity history map, a velocity vector $v_0$ of a mobile object which passes over the grid is determined by such a method as described hereinabove in connection with the embodiment 1, and a direction $\theta_k$ nearest to the direction of the determined velocity vector is selected from among the directions $\theta_1$ to $\theta_n$. Then, a norm of the velocity vector is recorded in the direction $\theta_k$. If a mobile object has moved by a plural number of times in the same direction over the same grid, then a maximum value $v_{max,k}$ of the norm of the velocity vectors measured till then is recorded.

Figure 11:
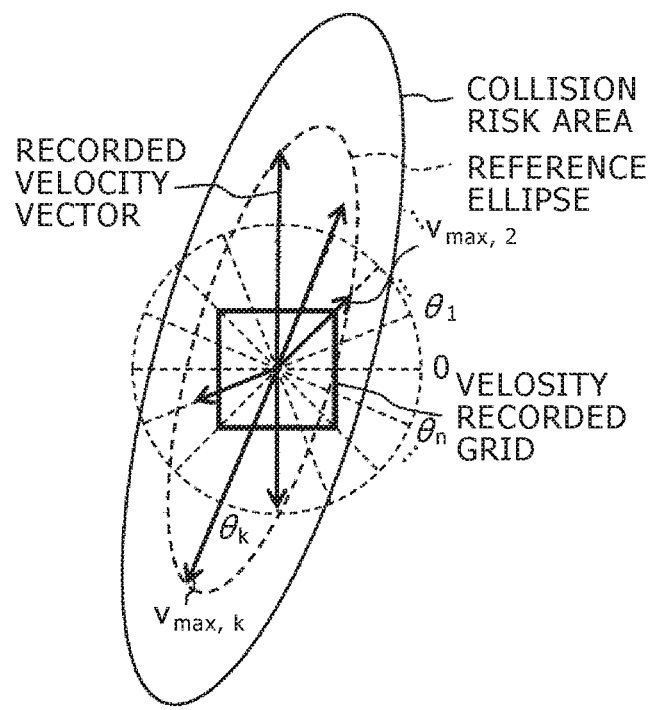
FIG. 11 is an explanatory view of collision risk area setting in the second embodiment.

A setting method of a collision risk area taking the moving direction of a mobile object into consideration is described with reference to FIG. 11. After a mobile object appearance point is detected by a method similar to that in the embodiment 1 described hereinabove, all velocity recorded grids just below the mobile object appearance point are referred to. If a mobile object passes by a plural number of times within a predetermined period as depicted in FIG. 11 over the velocity recorded grids referred to and a mobile object velocity is recorded in regard to several directions, then a reference ellipse which encloses all velocity vectors is supposed. Then, the reference ellipse is enlarged or reduced to set a collision risk area. If the mobile robot 1 bypasses the collision risk area set in such a manner as described above, then it can travel in a relationship spaced away from a direction or directions in which a mobile object is likely to advance.

By the configuration described above, a mobile robot system which takes also a moving direction of a mobile object from a mobile object appearance point into consideration can be provided.

It is to be noted that the present invention is not limited to the embodiments described hereinabove but includes various modifications. For example, the embodiments described above are described in detail so as to facilitate understandings of the present invention and may not necessarily include all components described hereinabove. Further, it is possible to replace some component of any of the embodiments with a like component of the other embodiment or to add some component of any of the embodiments as an additional component to the other embodiment. Further, a different component may be added to, deleted from or replaced with some component of each of the components.

Further, the components, functions, processing units, processing means and so forth described hereinabove may partially or entirely be implemented by hardware, for example, by designing them in the form of an integrated circuit. Further, the components, functions and so forth described above may be implemented by software through interpretation and execution of programs for implementing the functions by a processor. Information of programs, tables, files and so forth for implementing the functions can be placed into a memory, a recording apparatus such as a hard disk or a solid state drive (SSD), or a recording medium such as an IC card, an SC card or a DVD.

Further, control lines and information lines are depicted in the drawings only where they are necessary for description, and all control lines and information lines necessary for products are not depicted in the drawings. It may be considered that all components are actually connected to each other.

DESCRIPTION OF REFERENCE CHARACTERS

A: mobile robot system of the embodiment 1
1: mobile robot
10: inputting and outputting unit
11: outside world sensor
12: control unit
120: mobile object appearance point recognition unit
121: velocity history map production unit
122: collision risk area setting unit
123: traveling plan production unit
124: traveling controlling unit
125: traveling information recognition unit
13: traveling unit
130: driving wheel
131: motor
132: encoder
133: free type caster
14: battery
θ: angle
v: velocity

The invention claimed is:

1. A mobile robot system, comprising:
an outside world sensor configured to measure a position of an object in an environment surrounding the mobile robot system;
a traveling unit configured to displace an own position of the mobile robot system; and
a control unit configured to control the traveling unit, wherein:
history map data is provided, the history map data being indicative of positions in which the object has moved and velocity information of the object within a predetermined period;
based on information obtained from the outside world sensor, an appearance location, at which the object is not currently present but may be present in the future, is recognized;
the velocity information of the object which moved to a position in the vicinity of the appearance location is read out from the map data;
a shape of a collision risk area which is an area in which a possibility that the object will appear and collide with the mobile robot system in response to the velocity information is determined;
the control unit controls at least one of an advancing direction and a velocity of the mobile robot system in response to a positional relationship between the collision risk area and the mobile robot system; and
if a position of part of the object being obtained from the outside world sensor and having a width equal to or greater than a predetermined width set in advance overlaps with a movement position recorded in a velocity history map, then the part of the object is recognized as a door.

2. The mobile robot system according to claim 1, wherein:
if velocity information of the object is recorded into the velocity history map, a plurality of representative directions are provided by dividing an overall circumference at fixed angular intervals around the position of the object;
one of the representative directions which is nearest to the direction of a velocity vector of the object and a norm of the velocity vector are recorded at the position of the object; and
if the object moves a plural number of times, a maximum value of the norm of velocity is recorded.

3. The mobile robot system according to claim 1, wherein, if the position of the part of the object overlaps with the object movement position recorded in the velocity history map, then the object movement position is set as an appearance location of the object.

* * * * *